US012075903B2

(12) United States Patent
Lessman

(10) Patent No.: US 12,075,903 B2
(45) Date of Patent: Sep. 3, 2024

(54) WEARABLE WEAPON LICENSE IDENTIFICATION

(71) Applicant: Michael Lessman, Sparks, NV (US)

(72) Inventor: Michael Lessman, Sparks, NV (US)

( * ) Notice: Subject to any disclaimer, the term of this patent is extended or adjusted under 35 U.S.C. 154(b) by 128 days.

(21) Appl. No.: 17/862,306

(22) Filed: Jul. 11, 2022

(65) Prior Publication Data

US 2023/0218067 A1 Jul. 13, 2023

Related U.S. Application Data

(60) Provisional application No. 63/299,314, filed on Jan. 13, 2022.

(51) Int. Cl.

| | |
|---|---|
| ***A45F 3/14*** | (2006.01) |
| ***A45C 1/06*** | (2006.01) |
| ***G09F 3/02*** | (2006.01) |
| *A45F 3/00* | (2006.01) |

(52) U.S. Cl.

CPC .................. *A45F 3/14* (2013.01); *A45C 1/06* (2013.01); *G09F 3/02* (2013.01); *A45F 2003/002* (2013.01); *A45F 2003/142* (2013.01)

(58) Field of Classification Search

CPC .................. A45F 3/14; A45F 2003/002; A45F 2003/142; G09F 3/02; G09F 21/02; G09F 21/026; A45C 1/06

See application file for complete search history.

(56) References Cited

U.S. PATENT DOCUMENTS

| | | | | |
|---|---|---|---|---|
| 2,342,005 A * | 2/1944 | Mittag | A41D 13/01 | 2/92 |
| 3,214,852 A * | 11/1965 | Ford | G09F 3/005 | 40/640 |
| 4,195,836 A * | 4/1980 | Beyer | A63F 9/00 | 40/586 |
| D280,860 S * | 10/1985 | Monferrato | D2/829 | |
| 4,754,903 A * | 7/1988 | Dennis | A45F 3/16 | 248/102 |
| 5,624,065 A * | 4/1997 | Steffe | A45F 5/00 | 224/625 |
| 5,690,411 A * | 11/1997 | Jackman | G08B 5/006 | 362/108 |
| 7,192,152 B1 * | 3/2007 | Hesse | A63B 71/06 | 362/108 |
| 8,191,748 B2 | 6/2012 | Lessman | | |
| D725,312 S * | 3/2015 | Hilliard | D29/101.4 | |
| 9,433,263 B2 * | 9/2016 | Rowland | A44C 3/001 | |

(Continued)

*Primary Examiner* — Gary C Hoge

(74) *Attorney, Agent, or Firm* — Crump Law P.C.

(57) ABSTRACT

A wearable weapon license identification that folds onto itself into wallet configuration so that it can be readily stowed or carried in a pocket and unfolds into a deployed configuration so that it can be donned by a user. The identification includes a front placard, a rear placard and a pair of shoulder straps. The front placard folds over itself to form a wallet style pouch for receiving the rear placard and the shoulder straps therein. The front placard also includes a flat transparent pocket for receiving a state firearm license card, driver's license or other identification card, which is visible when the identification is deployed and donned by a user. Both the front and rear placards have indicia or lettering that is visible when the identification is unfolded and donned by a user.

10 Claims, 16 Drawing Sheets

(56) References Cited

U.S. PATENT DOCUMENTS

| | | | | |
|---|---|---|---|---|
| 2003/0188815 | A1* | 10/2003 | Hart | A45C 11/18 150/147 |
| 2007/0295772 | A1* | 12/2007 | Woodmansee | F41H 1/02 224/153 |
| 2010/0050485 | A1* | 3/2010 | Forte | G09F 21/02 40/1.5 |
| 2015/0113845 | A1* | 4/2015 | Ramirez, III | G09F 13/00 40/661.02 |
| 2023/0014989 | A1* | 1/2023 | Rasmussen | A45F 3/14 |
| 2023/0018611 | A1* | 1/2023 | Li | G09F 3/207 |

* cited by examiner

WEARABLE WEAPON LICENSE IDENTIFICATION

This application claims the benefit of U.S. Provisional Application No. 63/299,314 filed Jan. 13, 2022, the disclosure of which is hereby incorporated by reference. This invention relates to a wearable article to identify the wearer as a weapon carrying person.

BACKGROUND AND SUMMARY OF THE INVENTION

U.S. Pat. No. 8,191,748 discloses a personal identification apparatus used by law enforcement and first responders that allow the user to be visibly identified by other first responders in emergency and high threat events. The identification apparatus consists of a highly visible banner that can be carried and donned by law enforcement personnel and other first responders using one hand while manipulating a weapon. The identification apparatus reduces the risk of misidentification and blue on blue injuries. This identification apparatus is currently available from DSM Safety Products, of Reno Nevada. While suitable for law enforcement and first responders, civilians need a different apparatus to visibly identify them as being licensed carriers of firearms and weapons in emergency and high threat events that is visibly distinct from police and first responders.

This invention provides a wearable weapon license identification that folds onto itself into wallet configuration so that it can be readily stowed or carried in a pocket and unfolds into a deployed configuration so that it can be donned by a user. The identification includes a front placard, a rear placard and a pair of shoulder straps. The front placard folds over itself to form a wallet style pouch for receiving the rear placard and the shoulder straps therein. The front placard also includes a flat transparent pocket for receiving a state firearm license card, driver's license or other identification card, which is visible when the identification is deployed and donned by a user. Both the front and rear placards have indicia or lettering that is visible when the identification is unfolded and donned by a user. Typically the indicia is printed lettering or other markings, such as "ARMED CITIZEN," "CCL," "GOOD SAMARITAN" or similar words or phrases that allow the user to be visibly identified by other first responders when the identification is donned.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which.

DESCRIPTION OF THE PREFERRED EMBODIMENT

Figure 1:
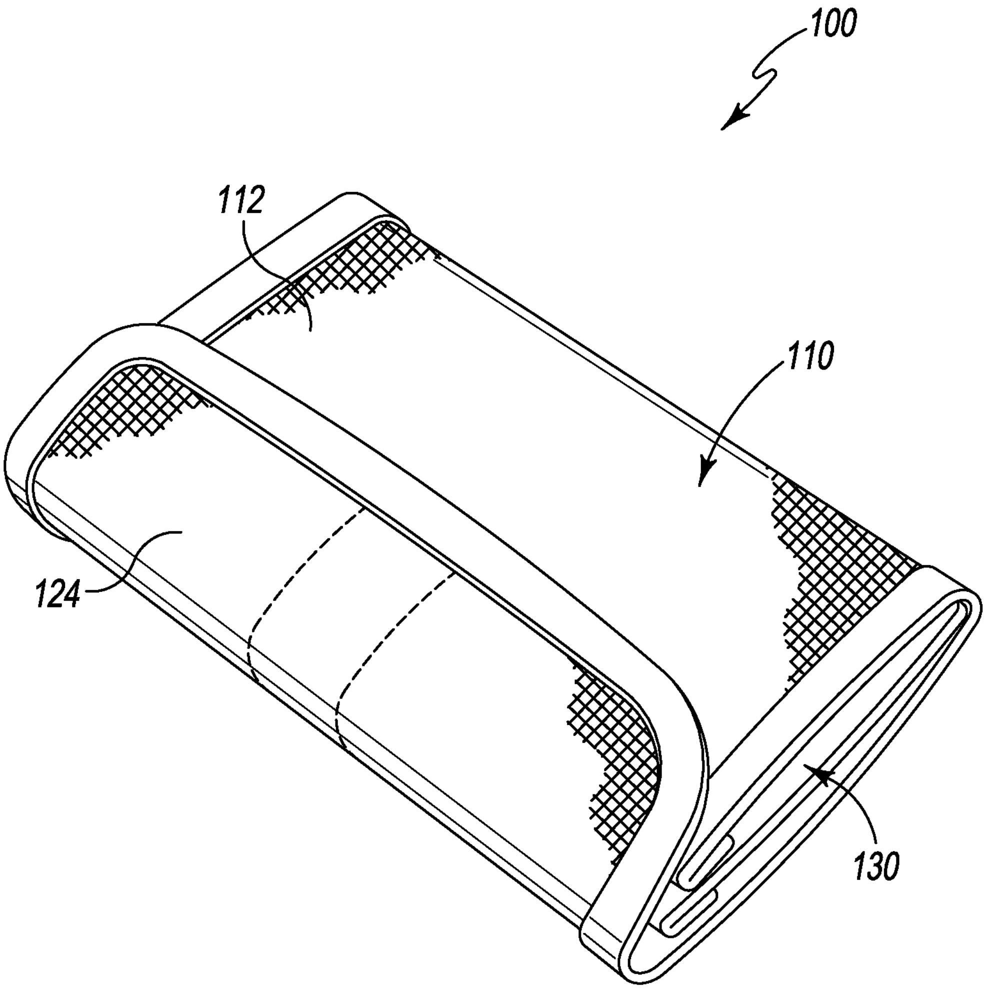
FIG. 1 is a perspective front view of an exemplary embodiment of the identification of this invention in the folded wallet configuration.

In the following detailed description of the preferred embodiments, reference is made to the accompanying drawings that form a part hereof, and in which is shown byway of illustration specific preferred embodiments in which the invention may be practiced. These embodiments are described in sufficient detail to enable those skilled in the art to practice the invention, and it is understood that other embodiments may be utilized and that logical, structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Referring now to the drawings, FIGS. 1-20 illustrate an exemplary embodiment of the wearable weapon license identification, which is designated generally as reference numeral 100. Identification 100 includes three main components: a front placard 110; a rear placard 130; and a pair of shoulder straps 150. Identification 10 folds onto itself into wallet configuration (FIG. 1), which can be readily stowed or carried in a pocket and unfolds into a deployed configuration (FIG. 2), which can be donned by a user (FIGS. 9 and 10). The various components of identification 100 are constructed from conventional fabrics and webbing and are sewn or bonded together using conventional methods. The fabrics and webbing are ideally durable, light-weight nylon fabrics, or of other suitable cloths and fabrics that resist tears, abrasions and scuffs as desired. The fabrics and webbings are also selected to lie substantially flat and compacted when folded over themselves.

Front placard 110 is constructed from overlying rectangular sheets of fabric joined by a perimeter piping. Front placard 110 is configured to have an exterior side 112 and interior side 114. Front placard 110 folds over itself to a wallet style pouch for receiving rear placard 130 and shoulder straps 150 therein. Generally, front placard 110 has a first section 120, a second section 122 and a closure flap 124. Front placard 110 folds onto itself so that first section 120 and second section 122 overlying one another. Closure flap folds over second section 122 and is secured by mating patches of hook and loop material 123. Front placard 110 also includes a flat transparent pocket 126 attached to first section 120 for receiving a state firearm license card, driver's license or other identification card (not shown). Pocket 126 allows the license card to be visible when identification 110 is deployed and donned by a user.

Rear placard 130 has a similar construction to front placard 110 and is dimensioned to approximately the size and configuration of second section 122 of front placard 110. Rear placard 130 may have an internal flat stiffener (not shown) that gives the rear placard some weight so that identification 100 hangs and remains flat on the user when donned. Shoulder straps 150 are lengths of nylon straps again generally colored in highly visible blase orange, yellow or similar colors. Each shoulder strap 150 has a longitudinal reflective stripe 152. Opposite ends of each shoulder strap 150 is sewn or otherwise affixed to front placard 110 and rear placard 130. Shoulder straps 150 are connected between front placard 110 and rear placard 130 and spaced parallel to one another. An elastic cross member 160 is sewn between shoulder straps 150 at a point approximately two thirds of the distance between front placard 110 and rear placard 130.

The fabric of exterior side 112 of front placard 110 is generally a dark color, such as black, which provides a discrete appearance when identification 100 is folded onto itself as a wallet pouch. The fabric of interior side 114 is a blaze orange, yellow or similar color, which provides a highly visible background for identification 100 when unfolded and donned by the user. Similarly, the fabrics of both sides of rear placard 130 are generally a highly visible color, such as a blaze orange, yellow or similar color. Certain colors, such as blaze orange, yellow, and white may be more noticeable in various light conditions and environments than other colors, such as black, navy blue, and the like.

Both front placard 110 and rear placard 130 have indicia or lettering 170 that is visible when identification 100 is unfolded and donned by a user. Typically the indicia is printed lettering or other markings, such as "ARMED CITIZEN," "CCL," "GOOD SAMARITAN" or similar words or phrases that allow the user to be visibly identified by other first responders when identification 100 is donned. Front placard 110 has indicia 170 placed on interior 114 of second section 122. Rear placard 130 has indicia 170 placed on both sides. In certain embodiments, Indicia 170 may be provided in the form of letters, numbers, or symbols that are formed from separate pieces of reflective fabric. Indicia 170 may then be secured with placard 110 and 130 using adhesives, stitching, and other known methods of affixing separate pieces of material to one another. In other embodiments, indicia 170 may be silk-screened or painted onto the fabric of the placards 110 and 130. Generally, indicia 170 is reflective in nature and contrasting to the background color of fabrics of front placard 110 and rear placard 130 to provide a greater degree of relative visibility in low light situations.

Figure 2:
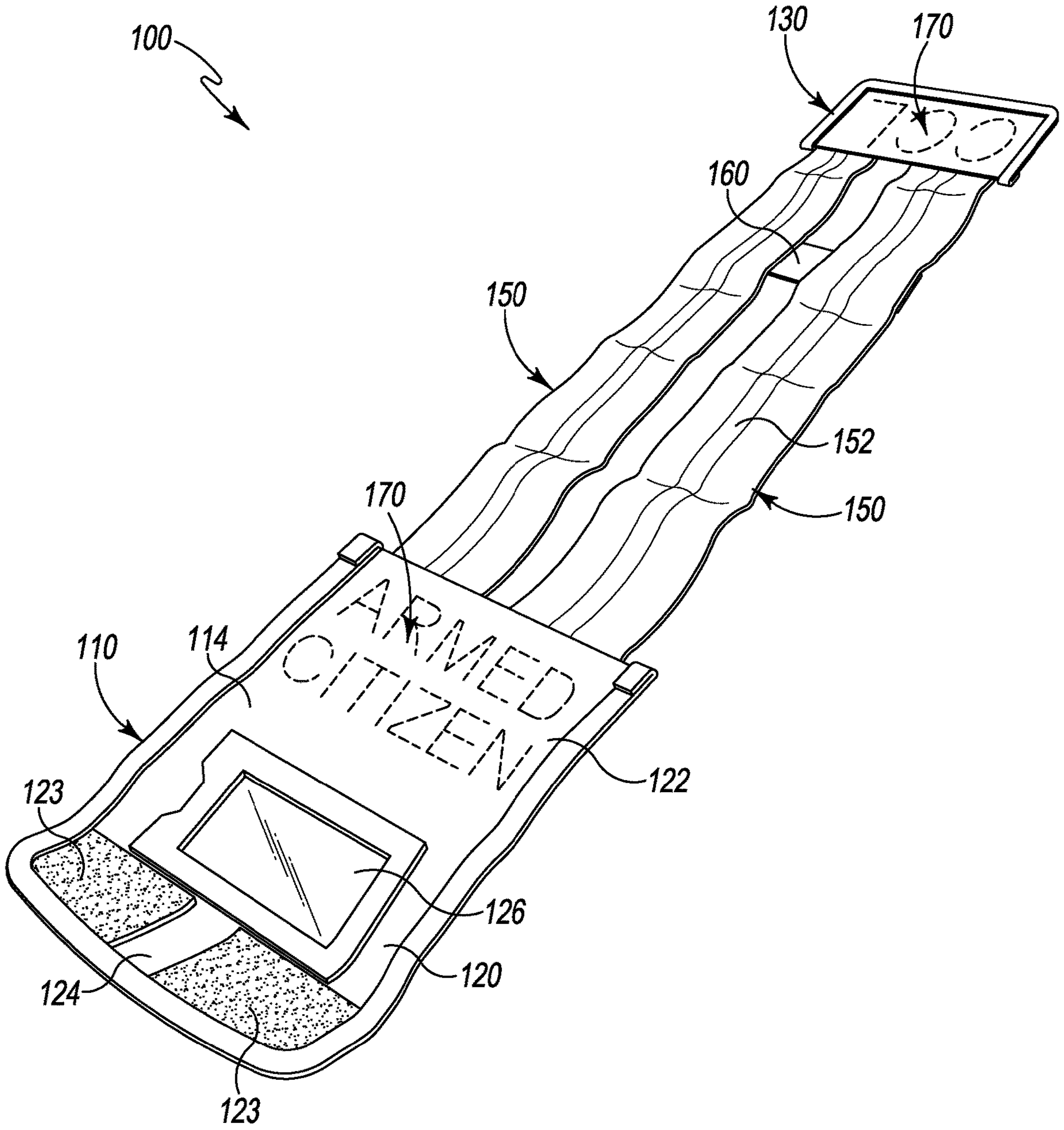
FIG. 2 is a front perspective view of the identification of FIG. 1 in the unfolded deployed configuration.
Figure 3:
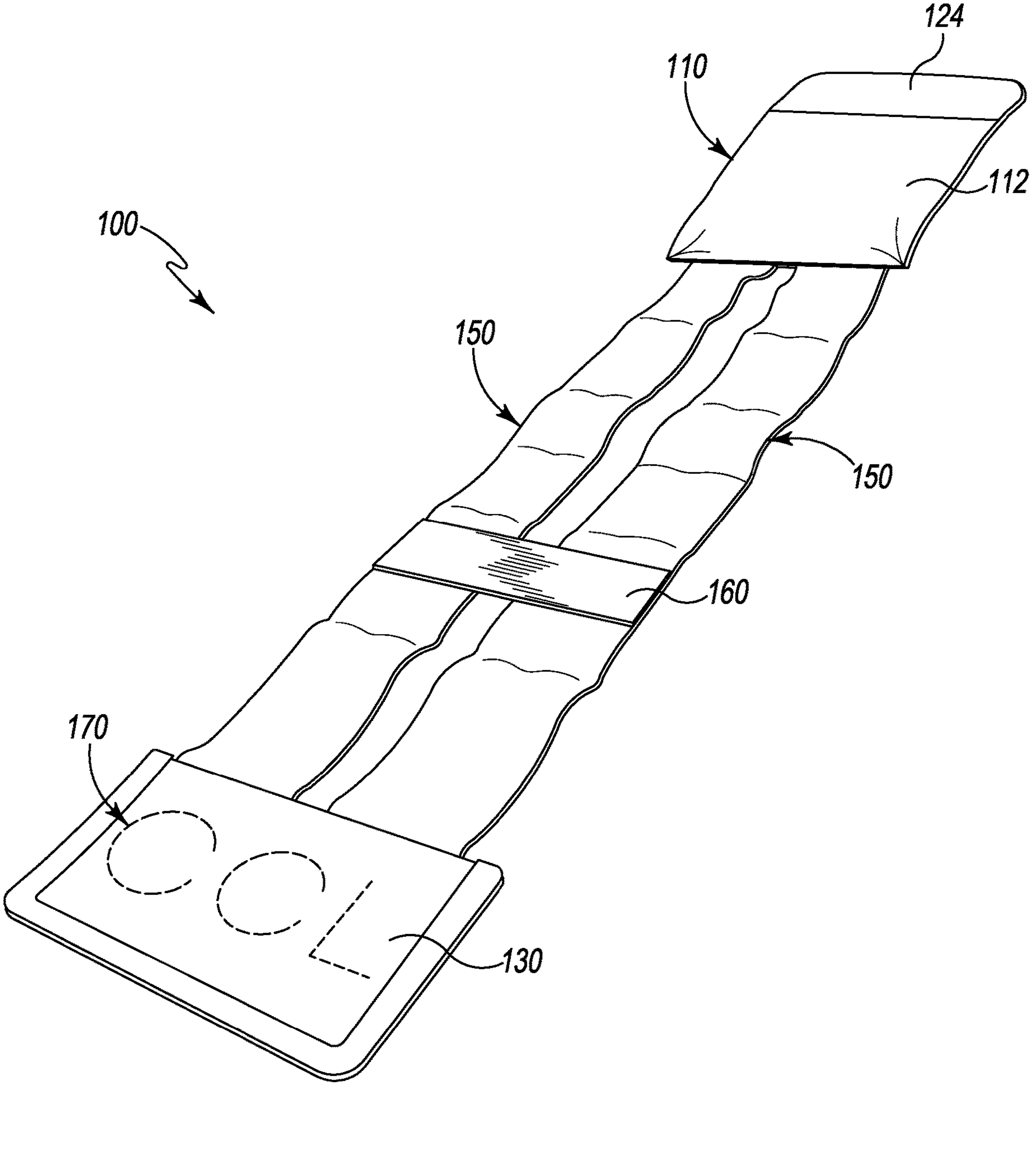
FIG. 3 is a rear perspective view of the identification of FIG. 1 in the unfolded deployed configuration.
Figure 4:
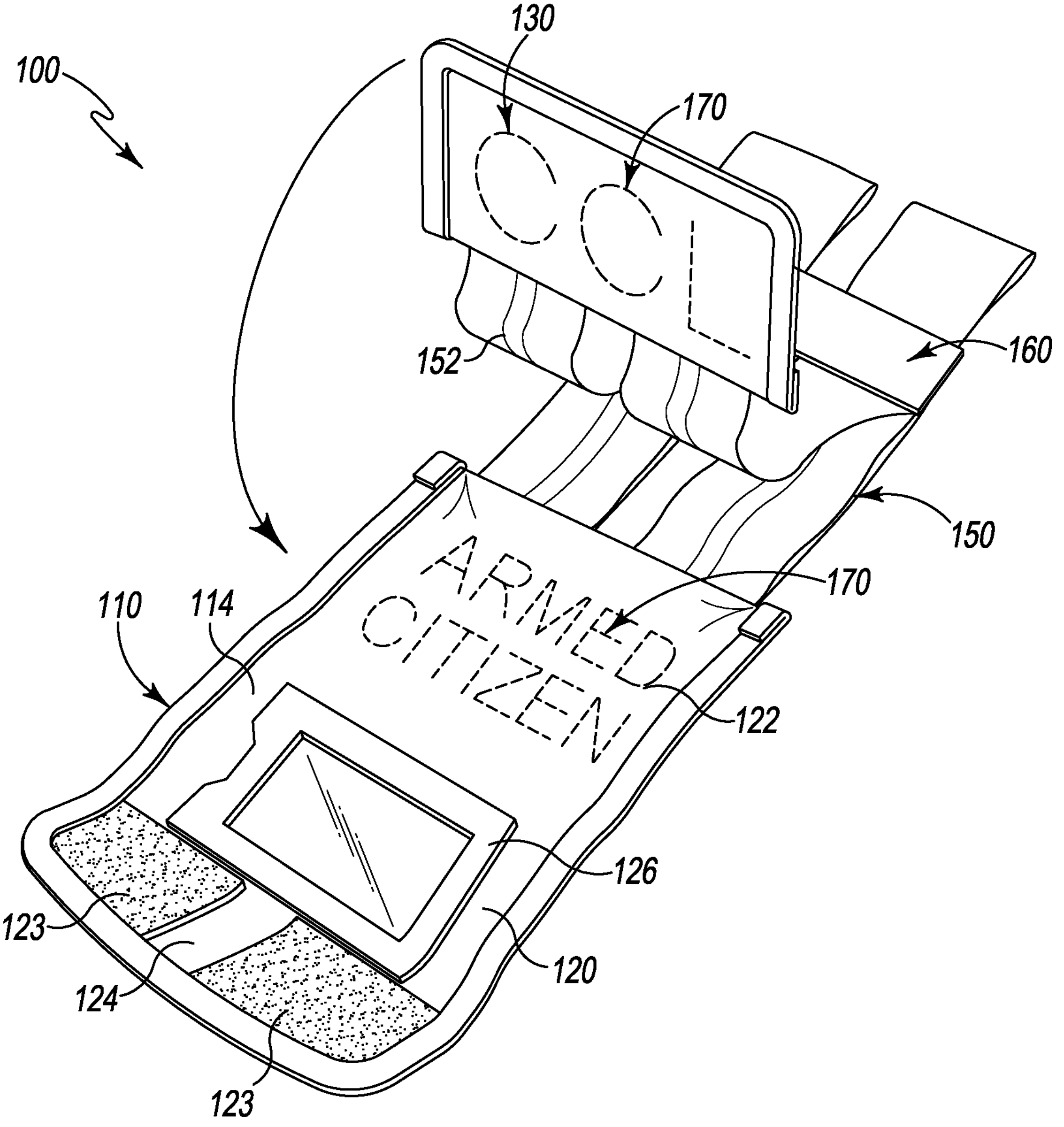
FIG. 4 is a perspective view of the identification of FIG. 1 with the shoulder straps and rear placard being folded in half.
Figure 5:
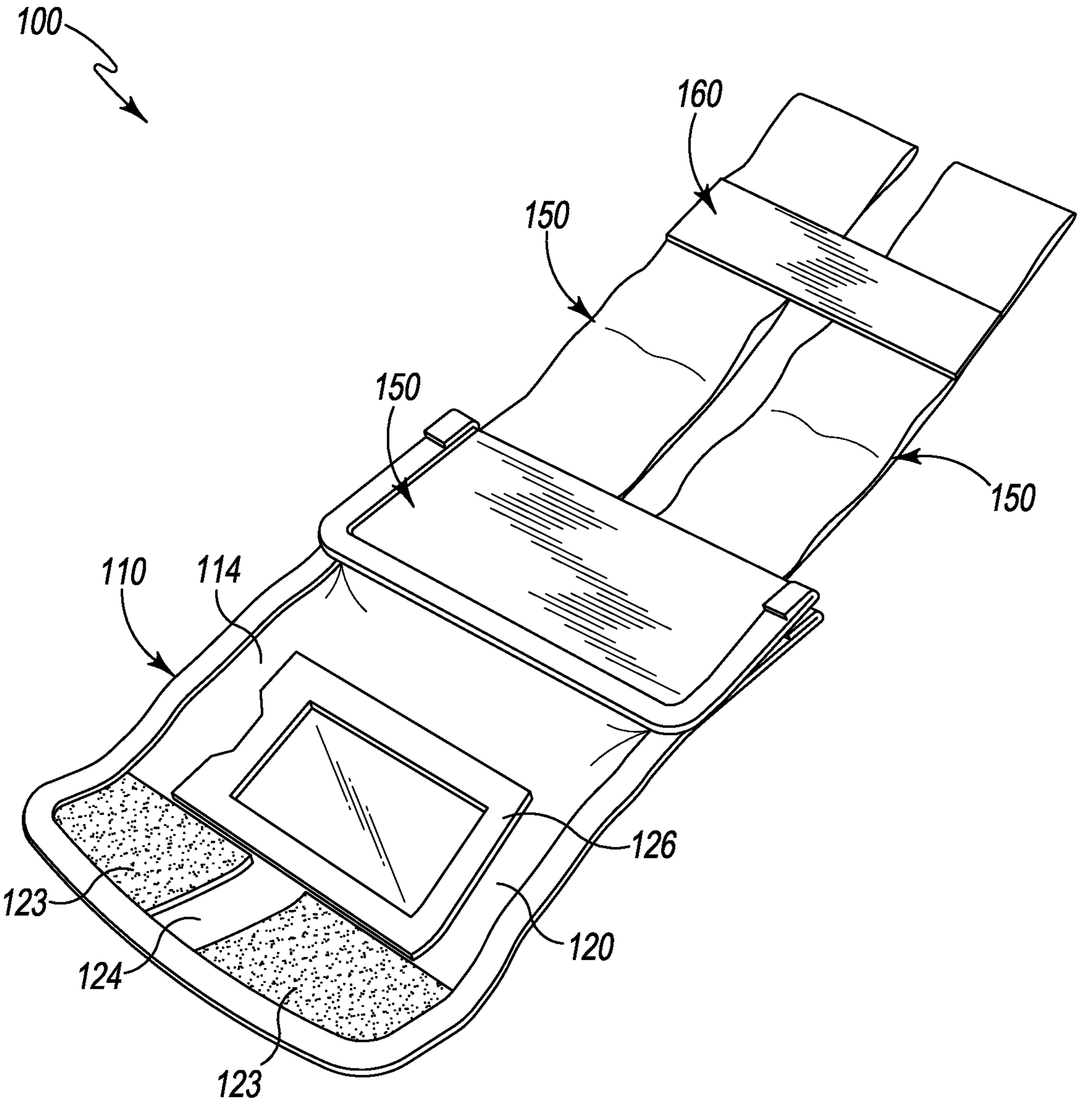
FIG. 5 is a perspective view of the identification of FIG. 1 with the shoulder straps and rear placard folded in half.
Figure 6:
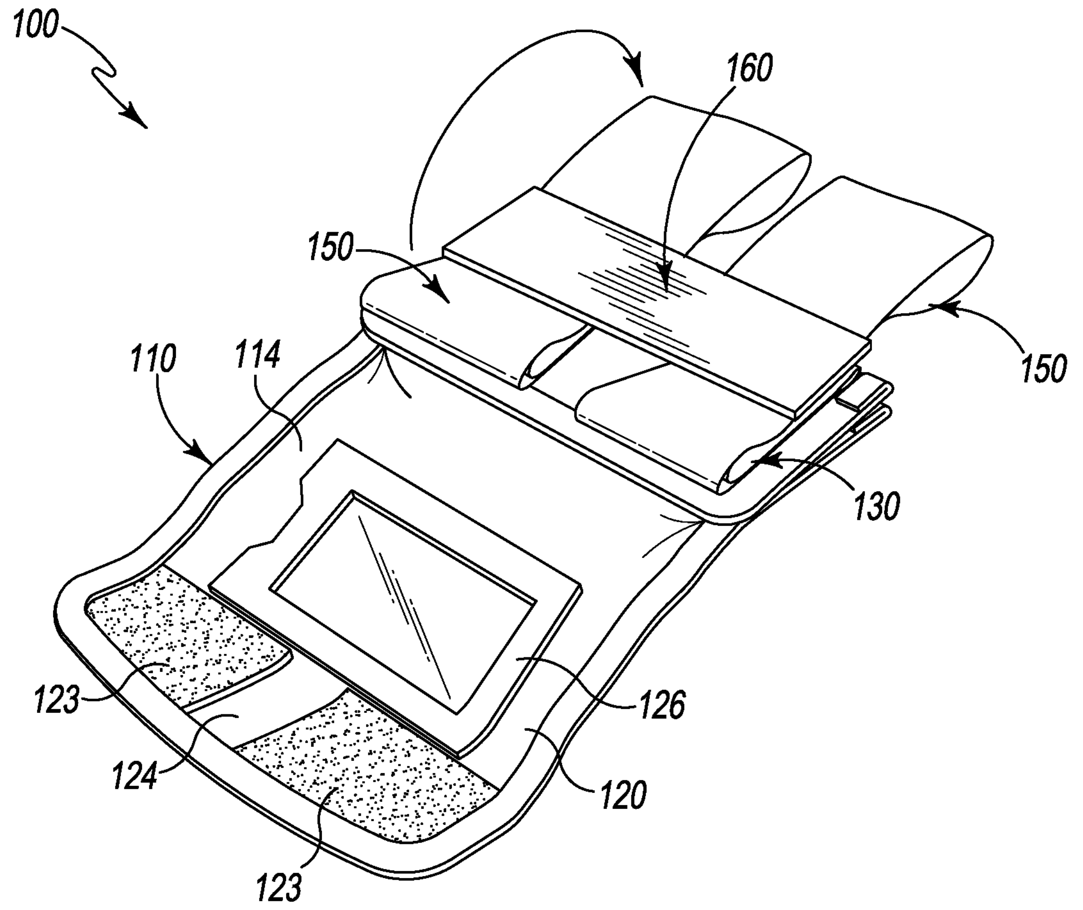
FIG. 6 is a perspective view of the identification of FIG. 1 with the shoulder straps and placard folded over the rear placard.
Figure 7:
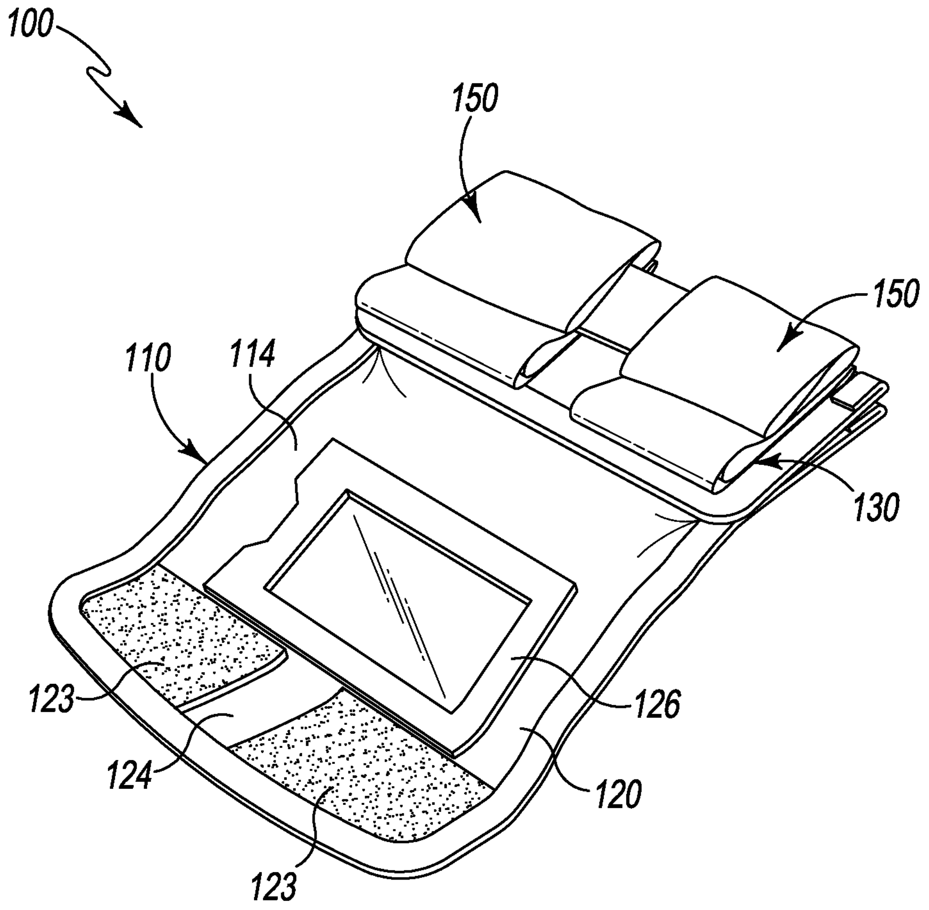
FIG. 7 is a perspective view of the identification of FIG. 1 with the shoulder straps and placard folded over itself again.

FIGS. 4-7 illustrate how identification 100 folds from the unfolded or deployed configuration (FIG. 2) into the wallet configuration (FIG. 1). First, shoulder straps 150 are folded in half and rear placard 130 is laid over the second section 122 of front placard 110 (FIGS. 4 and 5). Next, shoulder straps 150 are folded in half and then in half again to lay atop rear placard 130 (FIGS. 6 and 7). Next, second section 122 of front placard 110 along with the rear placard 130 and folded shoulder straps 150 are folded over first section 120. Finally, flap closure 124 is folded over the exterior side 112 of second section 114 of front placard 110 into the wallet configuration (FIG. 1). Hook and loop patches (not shown) hold flap closure 124 against the exterior side 112 of second section 122 to secure identification 100 in the wallet configuration. The folding sequence is reversed to open and unfold identification 100 from the wallet configuration to the unfolded deployed configuration.

Figure 8:
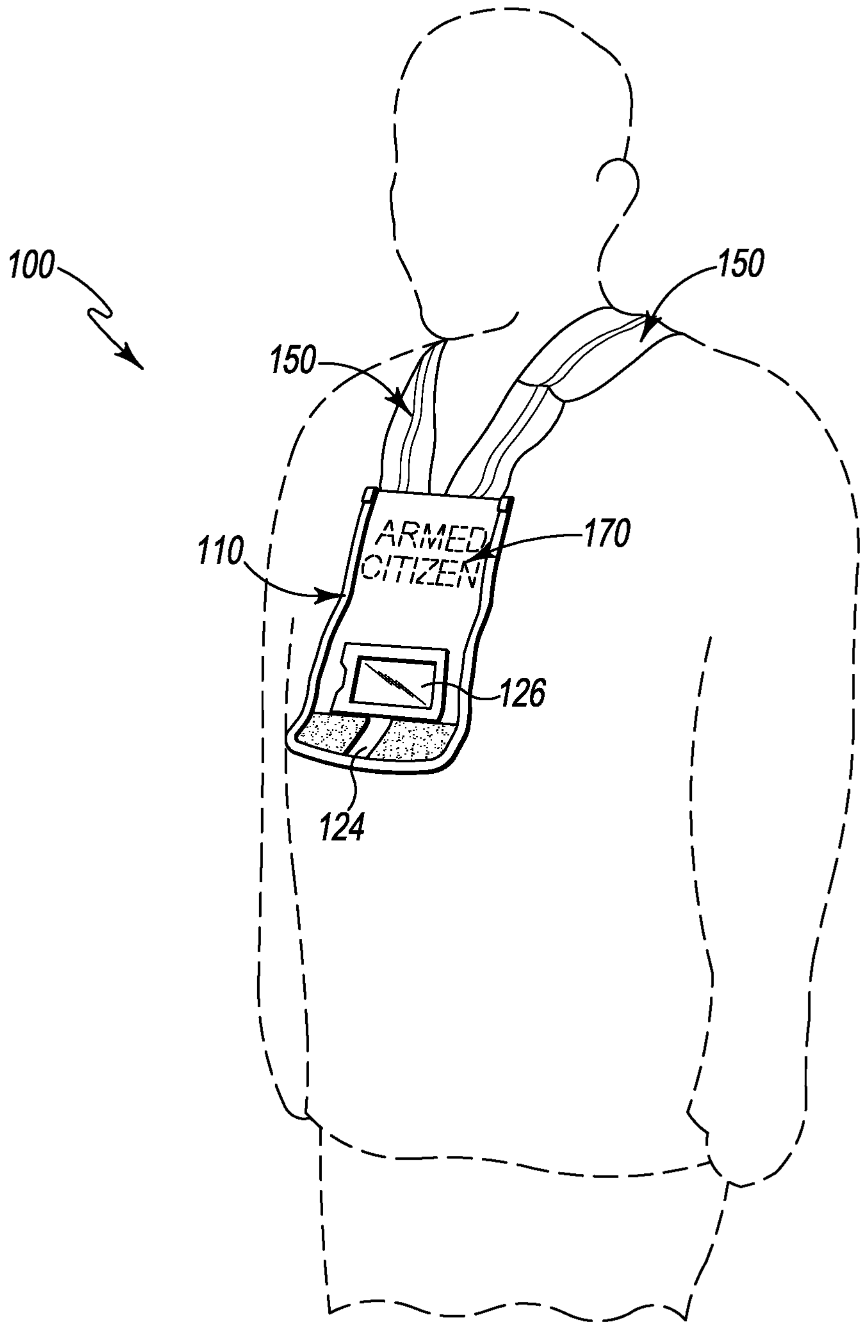
FIG. 8 is a front perspective view of the identification of FIG. 1 donned by a user.
Figure 9:
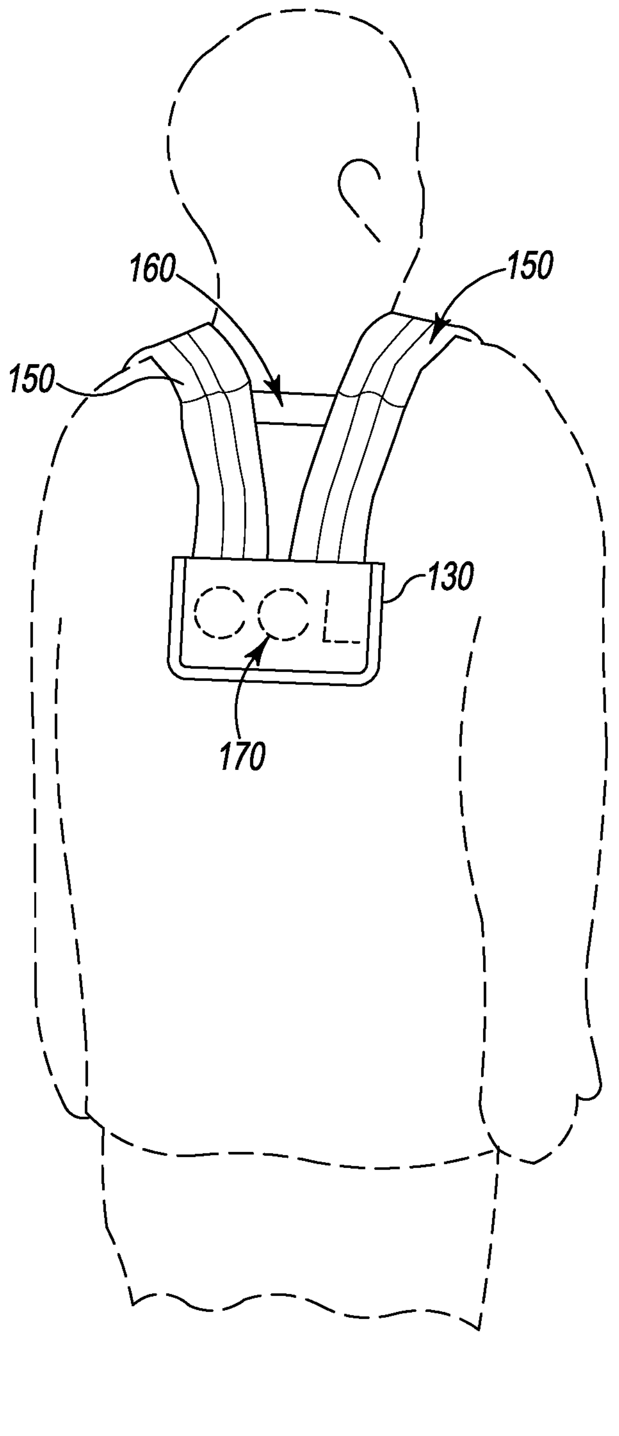
FIG. 9 is a rear perspective view of the identification of FIG. 1 donned by a user.
Figure 10:
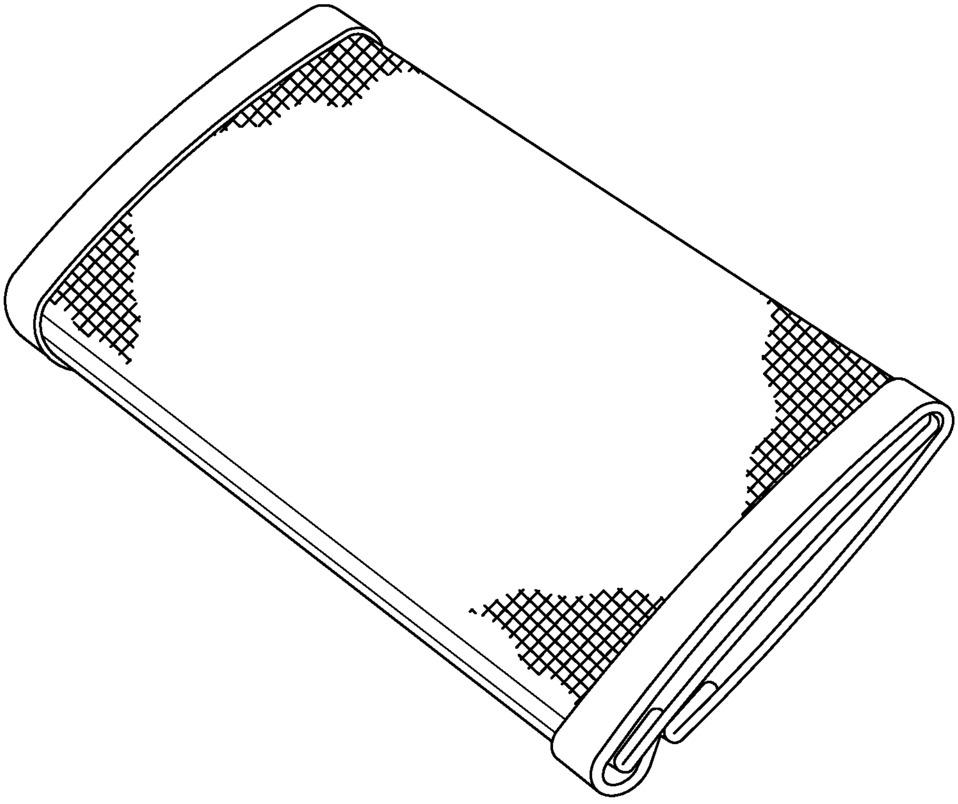
FIG. 10 is a perspective rear view of the identification of FIG. 1 in the folded wallet configuration.
Figure 11:
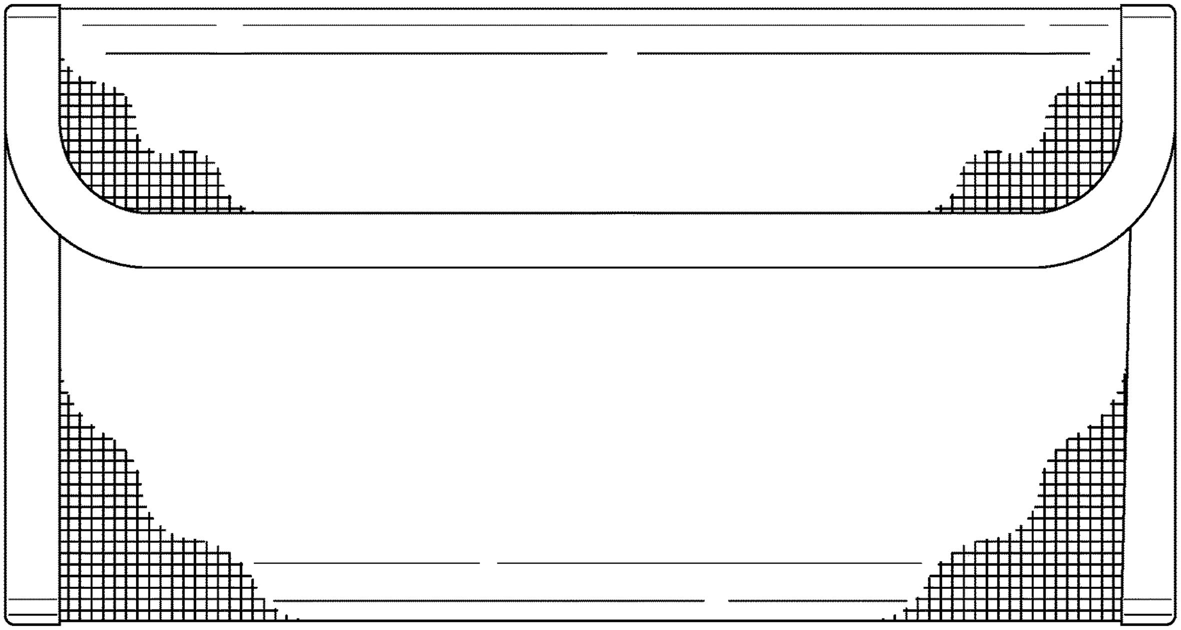
FIG. 11 is a front plan view of the identification of FIG. 1 in the folded wallet configuration.
Figure 12:
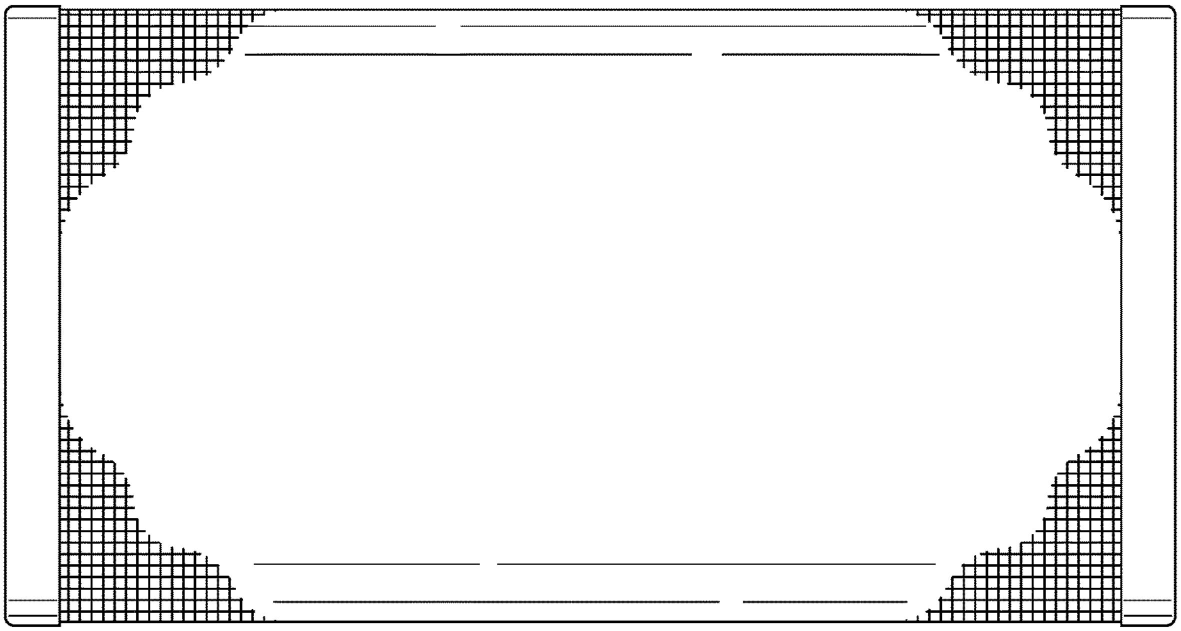
FIG. 12 is a rear plan view of the identification of FIG. 1 in the folded wallet configuration.
Figure 13:
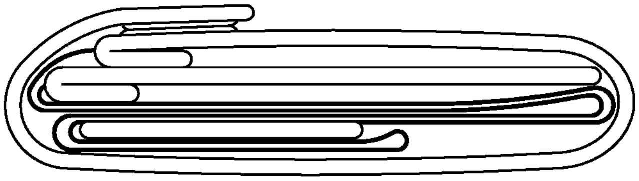
FIG. 13 is a right side view of the identification of FIG. 1 in the folded wallet configuration.
Figure 14:
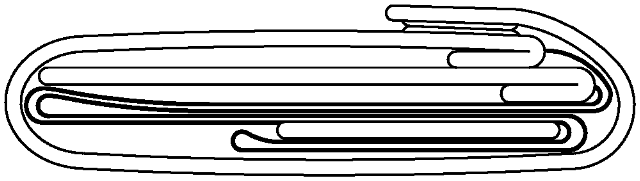
FIG. 14 is a left side view of the identification of FIG. 1 in the folded wallet configuration.
Figure 15:
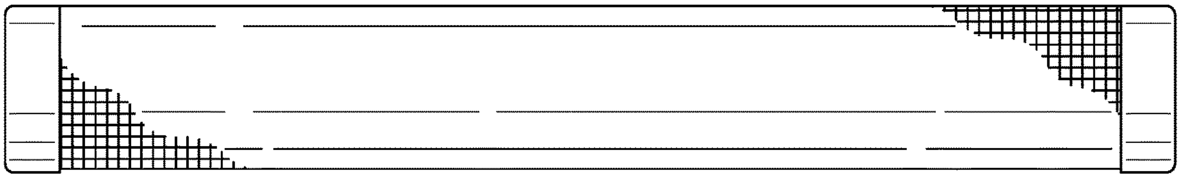
FIG. 15 is a top end view of the identification of FIG. 1 in the folded wallet configuration.
Figure 16:
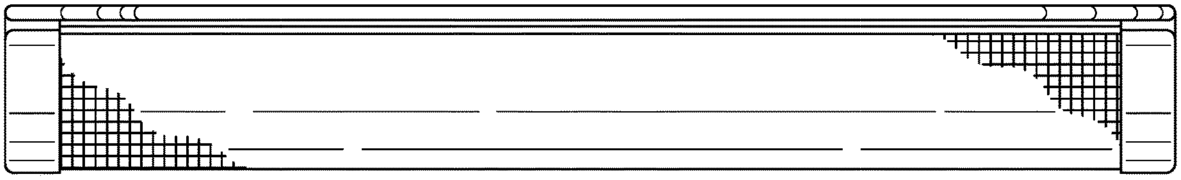
FIG. 16 is a bottom end view of the identification of FIG. 1 in the folded wallet configuration.
Figure 17:
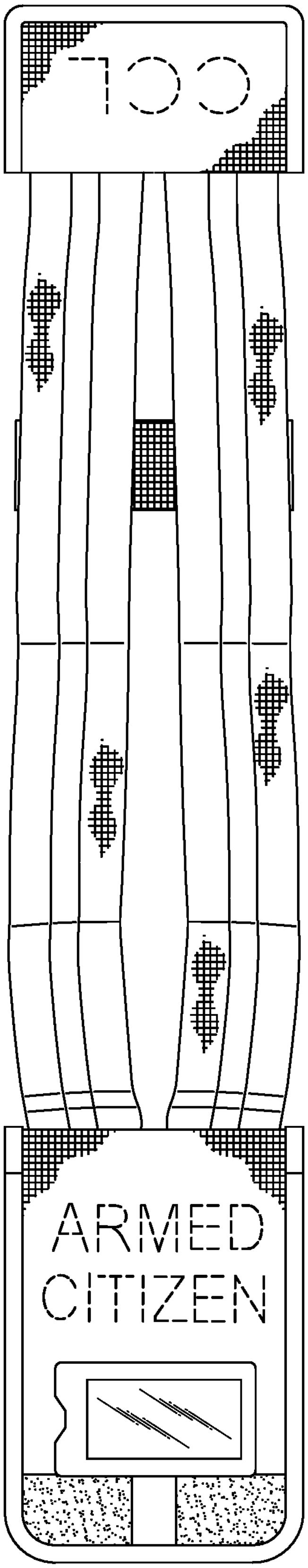
FIG. 17 is a front plan view of the identification of FIG. 1 in the unfolded deployed configuration.
Figure 18:
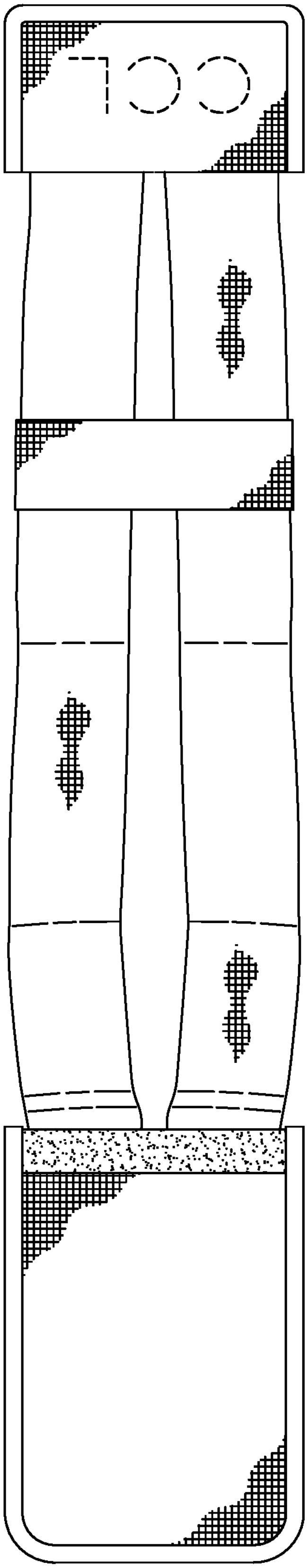
FIG. 18 is a rear plan view of the identification of FIG. 1 in the unfolded deployed configuration.
Figure 19:
FIG. 19 is a side plan view of the identification of FIG. 1 in the unfolded deployed configuration.
Figure 20:
FIG. 20 is an end view of the identification of FIG. 1 in the unfolded deployed configuration.

FIGS. 8 and 9 illustrate how identification 100 is donned by a user. As shown, identification 100 is worn with the user's head extending between shoulder straps 150 and front placard 110 and rear placard 130 centered over the user's torso and back respectively. Elastic cross member 160 extends across the user's back below the neck, which helps secure and position front placard 110 and rear placard 130 relative to the user.

When identification 100 is donned in the unfolded deployed position, indicia 170 and transparent pocket 126 on front placard 110 and the indicia 170 of rear placard 130 are visible.

It should be apparent from the foregoing that an invention having significant advantages has been provided. While the invention is shown in only a few of its forms, it is not just limited but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. A wearable weapon license identification comprising:

a front placard adapted to be worn over the front of a wearer;

a rear placard adapted to be worn over the back of a wearer; and a pair of shoulder straps connected between the front placard and rear placard, the front placard having a first placard section and second placard section integrally connected to the first placard section to fold between a wallet configuration where the second placard section overlying the first placard section for enclosing there between the pair of shoulder straps and the rear placard so that the identification can be stowed or carried on a person and a deployed configuration where the first placard section and the second placard section extend side-by-side to one another and the rear placard and the pair of shoulder straps extends from the front placard so that the identification can be donned over the head and body of a person.

2. The identification of claim 1 wherein the pair of shoulder straps spaced parallel to one another when the front placard is in the deployed configuration so that the pair of shoulder straps overlie the shoulders and head of the wearer when the identification is donned.

3. The Identification of claim 1 wherein the first placard section includes a transparent pocket for receiving an identification card.

4. The identification of claim 1 wherein the second placard section has indicia visible when the front placard is in the deployed position and the identification is donned by a wearer.

5. The identification of claim 1 wherein the rear placard has indicia visible when the identification is in the deployed configuration and donned by a wearer.

6. The Identification of claim 1 wherein each of the pair of shoulder straps having a first strap end connected to the front placard and a second strap end connected to the rear placard.

7. The identification of claim 6 and a cross strap connects the pair of shoulder straps at a point between the first strap ends and the second strap ends.

8. The identification of claim 1 wherein each of the pair of shoulder straps has a reflective stripe.

9. The identification of claim 1 wherein the front placard is constructed of a fabric.

10. A wearable weapon license identification comprising:

a front placard;

a rear placard; and a pair of shoulder straps connected between the front placard and rear placard, each of the pair of shoulder straps having a first strap end connected to the front placard and a second strap end connected to the rear placard; and a cross strap connects the pair of shoulder straps at a point between the first strap ends and the second strap ends, the front placard having a first placard section and second placard section flexibly connected to the first placard section to fold between a wallet configuration where the second placard section overlying the first placard section for receiving there between the pair of shoulder straps and the rear placard so that the identification can be stowed or carried on a person and a deployed configuration where the first placard section and the second placard section extend side-by-side to one another and the rear placard and the pair of shoulder straps extends from the front placard so that the identification can be donned over the head and body of a person.

* * * * *